United States Patent [19]
Eguchi

[11] Patent Number: 4,658,582
[45] Date of Patent: Apr. 21, 1987

[54] VOLUME CONTROL DEVICE FOR VARIABLE VOLUME PUMP FOR AUTOMATIC TRANSMISSION

[75] Inventor: Shinsuke Eguchi, Fujisawa, Japan

[73] Assignee: Nissan Motor Co., Ltd., Yokohama, Japan

[21] Appl. No.: 655,555

[22] Filed: Sep. 28, 1984

[30] Foreign Application Priority Data

Oct. 4, 1983 [JP] Japan .................... 58-184428

[51] Int. Cl.[4] ............................................. F16D 33/00
[52] U.S. Cl. ..................................... 60/357; 74/606 R
[58] Field of Search ............... 91/506, 497; 74/606 R; 60/357, 358

[56] References Cited

U.S. PATENT DOCUMENTS

| | | | |
|---|---|---|---|
| 2,452,704 | 11/1948 | Wahlmark | 91/506 X |
| 3,049,884 | 8/1962 | Schroeder | 91/506 X |
| 4,333,358 | 6/1982 | Grattapaglia | 74/606 R X |
| 4,506,772 | 3/1985 | Sommer | 74/606 R X |

Primary Examiner—A. Michael Chambers
Assistant Examiner—John C. Fox
Attorney, Agent, or Firm—Schwartz, Jeffery, Schwaab, Mack, Blumenthal & Evans

[57] ABSTRACT

A cylinder of a volume control device for a variable volume pump is formed as a separate piece from a converter housing and mounted to an outer wall of the converter housing with a portion overlapping a transmission case fixedly secured to the converter housing.

4 Claims, 2 Drawing Figures

VOLUME CONTROL DEVICE FOR VARIABLE VOLUME PUMP FOR AUTOMATIC TRANSMISSION

BACKGROUND OF THE PRESENT INVENTION

The present invention relates to an automatic transmission and particularly to a volume control device for a variable volume pump mounted to an automatic transmission. More particularly, the present invention relates to an improvement in mounting a volume control device.

Commonly, an automatic transmission comprises a combined structure of a transmission case with a converter housing, the transmission case accommodating therein a change speed gearing and various frictional elements which have a function to shift speed ratio by switching power delivery path, the converter housing accommodating therein a torque converter to be disposed between the change speed gearing and an engine. An oil pump which is adapted to supply actuating oil to the above mentioned frictional elements and the torque converter is arranged near the mating surface of the transmission case with the converter housing.

In the case of the above mentioned oil pump is a variable volume pump, a volume control device thereof may be constructed and arranged in such a manner as disclosed by Japanese Patent Application Provisional Publication No. 57-62986 or as illustrated in FIG. 2. That is, there is formed a cylinder bore c in a converter housing b to which a transmission case a is fixedly secured, a piston d is slidably fit in this cylinder bore c, and a push rod e has one end engaged with the piston d and an opposite end abuttingly engaged with a volume varying element (not shown).

With this volume control device, a control pressure is supplied to a pressure chamber f, urging the piston d and the piston rod e to move the volume varying element, and the volume of the pump can be controlled by this movement of the volume varying element.

However, since according to the volume control device constructed as above the cylinder bore c is formed in the converter housing b and the piston d is disposed in the cylinder bore, the axial length (horizontal length as viewed in FIG. 2) of the automatic transmission inevitably increases by an amount corresponding to a diameter of the cylinder portion having the bore c.

SUMMARY OF THE INVENTION

An object of the present invention is to provide a mounting arrangement and structure of a piston and a cylinder portion of a volume control device of a variable volume pump in order to shorten the axial length of an automatic transmission.

According to the present invention, a cylinder of a volume control device is formed as a separate piece from a converter housing and mounted to an outer wall of the converter housing with a portion thereof overlapping a transmission case secured to the converter housing.

DESCRIPTION OF THE PREFERRED EMBODIMENT

Figure 1:
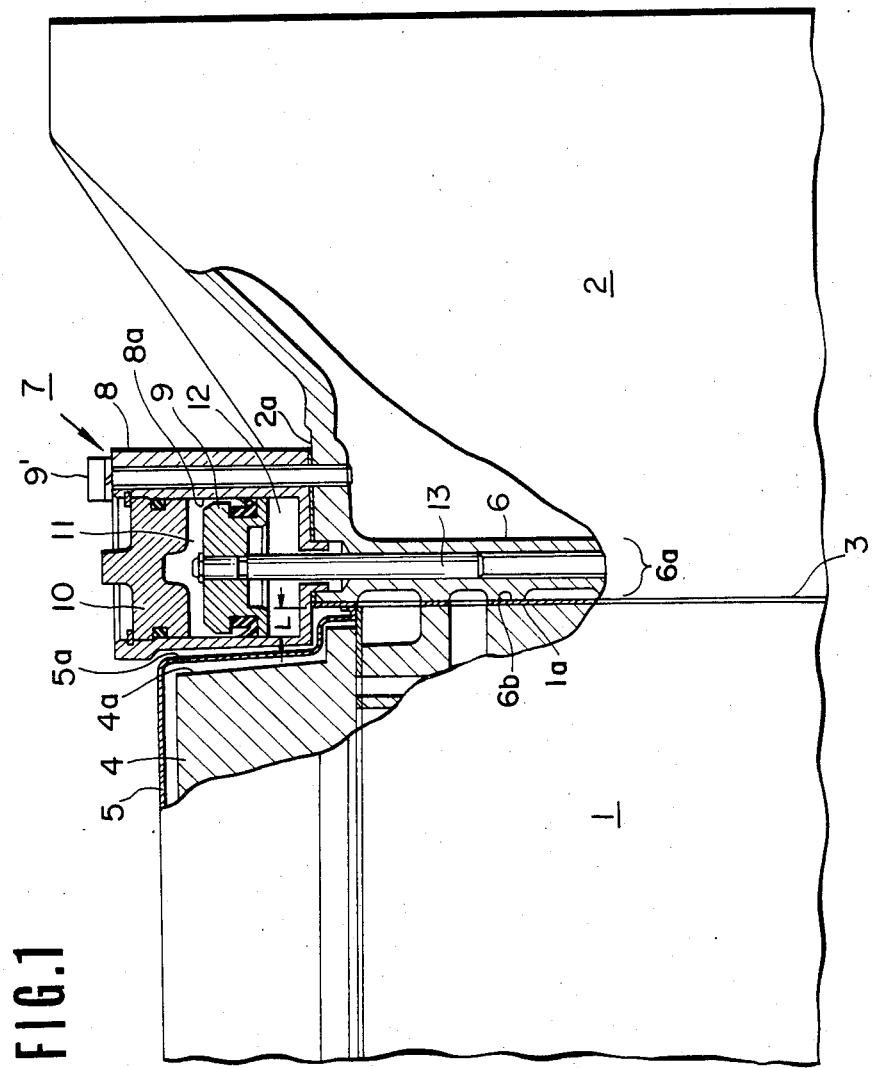
FIG. 1 is a partly sectioned view of an automatic transmission equipped with a volume control device according to the present invention.
Figure 2:
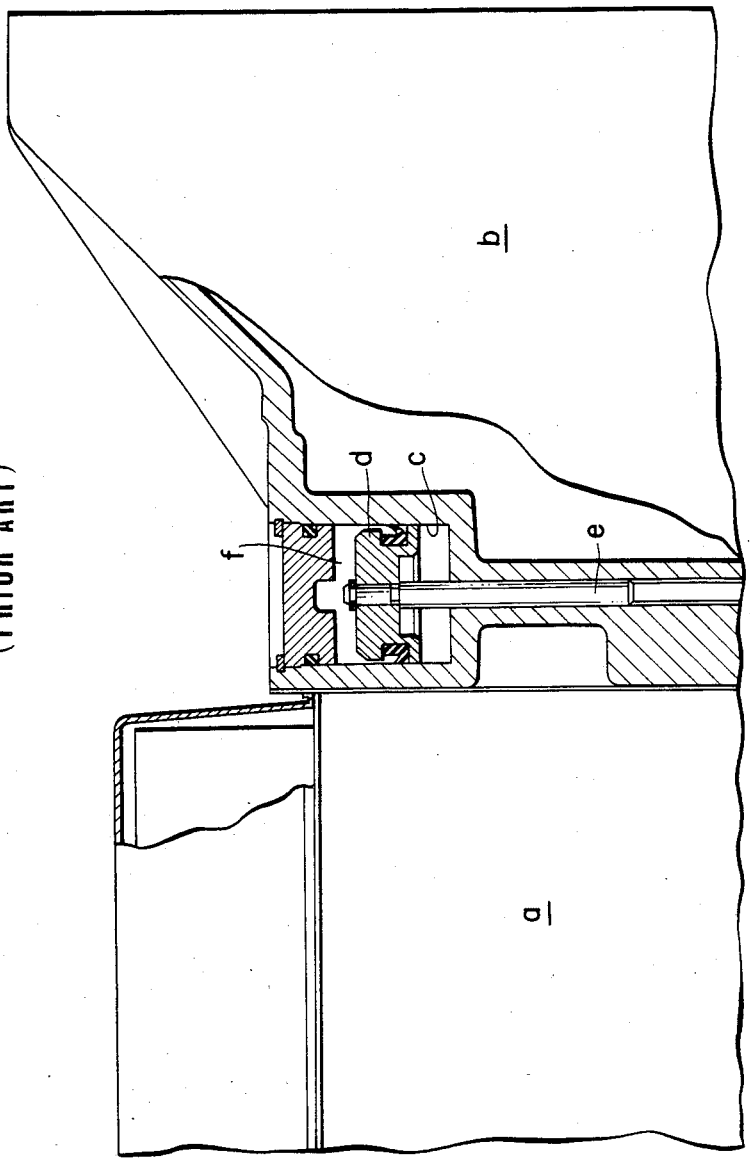
FIG. 2 is a partly sectioned view similar to FIG. 1 illustrating the previously discussed volume control device.

Referring to FIG. 1 of the accompanying drawings a preferred embodiment according to the present invention is described.

FIG. 1 shows a portion of an automatic transmission equipped with a volume control device according to the present invention. In the Figure, the reference numerals 1 and 2 designate a transmission case and a converter housing, respectively, which are fixedly secured to each other with a gasket 3 interposed therebetween. Accommodated within the transmission case 1 are a change speed gearing and various frictional elements (clutches and brakes) having a function to shift speed ratio by switching power delivery path. Mounted onto the transmission case 1 is a valve body 4 which selectively and hydraulically actuates the various frictional elements to effect shifting operation. This valve body 4 is surrounded by a cover 5. Mounted within the converter housing 2 is a torque converter which functions to transmit engine output to an input shaft of the above mentioned change speed gearing after carrying out torque multiplication. The converter housing 2 is formed with a pump housing 6 having a width 6a and an end surface 6b therof via which the housing 6 is fixedly secured to an end face 1a of the transmission case 1. The pump housing 6 includes a variable volume pump which has a volume control device which is moved by a volume control device 7 according to the present invention thereby to control volume of the pump.

The volume control device 7 is provided with a cylinder 8 which is formed as a separate piece from the converter housing 2. This cylinder 8 is secured to the outer wall of the converter housing 2 via bolt means 9'. The cylinder 8 is so disposed as to overlap a portion of the transmission case 1. For allowing the cylinder 8 extending over the transmission case 1, the valve body 4 and the cover 5 are recessed at portions 4a and 5a, respectively. The amount of recession of these recessed portions 4a and 5a are determined such that valves and oil conduits within the valve body 4 are not affected.

The cylinder 8 includes a cylinder bore 8a within which a piston 9 is slidably fit. The cylinder bore 8a has an open end closed by a plug 10 thereby to define a pressure chamber 11 between the plug 10 and the piston 9. On the opposite side of the piston 9, a drain chamber 12 is defined, which chamber 12 is connected with a drain port. A push rod 13 has one end securely fixed to the piston 9 and has an opposite end extending through the chamber 12 outward of the cylinder 8 and slidably into the pump housing 6 until it abuts against the pump volume varying element.

The operation of the above mentioned embodiment is hereinafter described.

Control pressure is supplied via an unillustrated passage to the pressure chamber 11, causing the piston 9 and the push rod 13 to stroke in accordance with valve of the control pressure. The push rod 13 displaces the volume varying element of the variable volume pump in accordance with the stroke thereof, thus controlling the pump volume, allowing the volume of the variable volume pump to be adjusted to a corresponding value to said control pressure.

Since, in the volume control device according to the present invention, the cylinder 8 is formed as a separate piece from the converter housing 8 and is mounted to the outer wall of thereof with a portion overlapping the transmission case 1, the diameter of the cylinder 8 does not cause an increase in the axial length (a horizontal direction as viewed in FIG. 1) of the automatic transmission and the axial length of the automatic transmission has been shortened by a length L by which the cylinder 8 overlaps the transmission case 1.

What is claimed:

1. In automatic transmission:
    a transmission case;
    a gasket;
    a converter housing having a peripheral surface and being fixedly secured to said transmission case, said gasket being interposed between said housing and said case and lying in a plane;
    a volume control device including a cylinder formed with a cylinder bore and a piston slidably fit in said cylinder bore, said cylinder being formed as a separate piece from said converter housing and secured to said converter housing on said peripheral surface, said cylinder having a portion radially extending toward said transmission case beyond said plan where said gasket lies;
    wherein said transmission case includes a valve body with a cover, said valve body and said cover being recessed to allow extension of said portion of said cylinder toward said transmission case.

2. The transmission as claimed in claim 1, wherein said cylinder extends beyond a peripheral portion of said housing.

3. An automatic transmission with a reduced axial length, comprising:
    a transmission case having an end face and further having along a peripheral portion thereof a valve body and a cover, said valve body and said cover being recessed from said end face;
    a converter housing having a pump housing secured along one side thereof, said pump housing forming a width between said end face and said converter housing and including means for securement to said end face of said transmission case;
    a volume control device including a push rod received in said pump housing and a cylinder formed separately from, and outside of, said converter housing and having a diameter substantially greater than said width of said pump housing, said cylinder being positioned adjacent said recessed valve body and cover such that a peripheral portion of said cylinder extends toward said valve body and cover in a direction away from said end face of said transmission case.

4. An automatic transmission as claimed in claim 3, wherein said cylinder is secured to said outer wall of said converter.

* * * * *